Patented Feb. 14, 1950

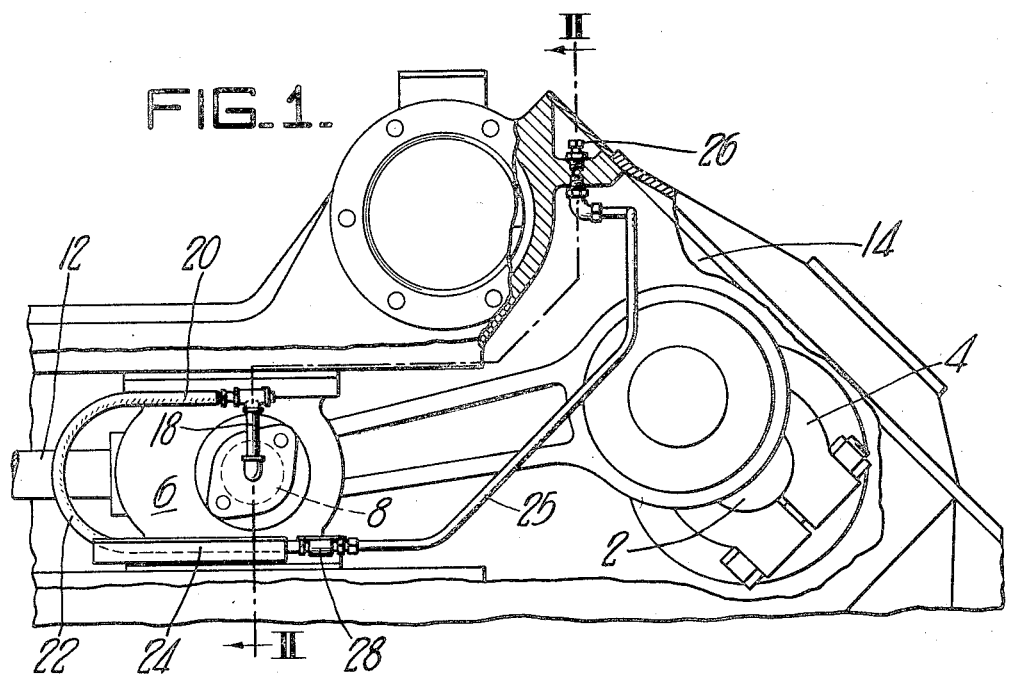
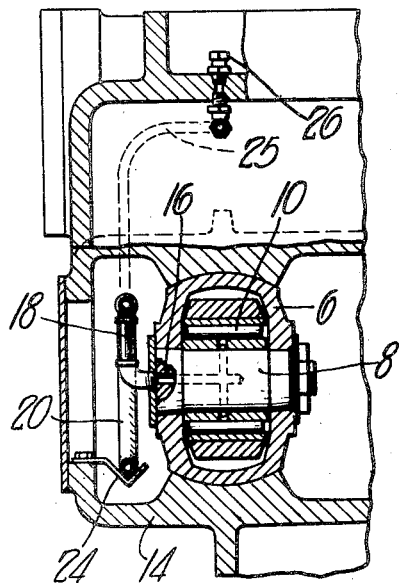
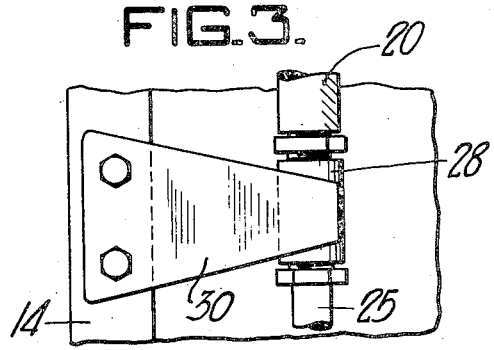
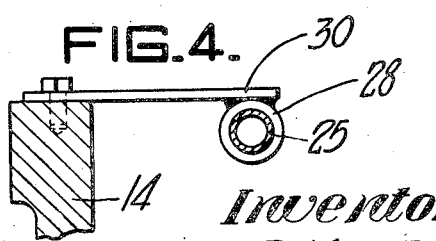
Inventors:
AUGUST R. MAIER and
WILLIAM J. REDMAN,
by Donald G. Dalton
their Attorney.

2,497,089

UNITED STATES PATENT OFFICE 2,497,089

LUBRICATING MEANS FOR CROSSHEAD PINS

August R. Maier, Oil City, and William J. Redman, Pittsburgh, Pa., assignors to Oil Well Supply Company, a corporation of New Jersey Application November 13, 1945, Serial No. 628,096

4 Claims. (Cl. 184—8)

This invention relates to improvements in means for lubricating reciprocating members and more particularly to means for lubricating the crosshead pin of reciprocating power pumps and the like.

In reciprocating power pumps, such as are used for pumping the drilling mud used in rotary well drilling operations through the well, the crosshead pin which receives the thrust of the crank is commonly lubricated by a splash system. Due to the wide temperature ranges to which such pumps are subjected in use, moisture collects in the oil bath enclosure, and together with the dust that gets into the oil causes excessive wear and corrosion on the anti-friction crosshead pin bearing. Forced feed lubrication has been proposed to overcome these defects of the splash system, but no satisfactory means have heretofore been provided for connecting the reciprocating crosshead pin to a source of lubricant on the outside of the pump housing.

It is accordingly an object of this invention to provide an arrangement for lubricating crosshead pin bearings that provides positive lubrication at all times.

It is a further object to provide means for pressure lubrication of crosshead pin bearings.

It is another object of this invention to provide a means for lubricating crosshead pin bearings that is simple in construction and durable in operation.

The foregoing and further objects will become apparent from the following description taken in conjunction with the accompanying drawing, wherein:

Figure 1 is an end elevation of a power pump with the housing partly broken away to show our improved lubricating means for the crosshead;

Figure 2 is a section on line II—II of Figure 1;

Figure 3 is an enlarged detail; and

Figure 4 is a section of Figure 3.

Referring more particularly to the drawing, the numeral 2 designates a crank shaft having at least one crank 4 connected to a crosshead 6 by means of a crosshead pin 8 having a bearing 10 thereon. The crosshead may be connected to any desired type of reciprocating mechanism, such as a pump, by a piston rod 12. The crank shaft, crank and crosshead are mounted in a suitable housing 14.

The bearing 10 is lubricated through duct 16 in the pin 8, which is connected to a source of lubricant outside the housing 14 in the following manner. A rigid upstanding pipe 18 is connected to the outer end of duct 16 and extends upwardly to a point adjacent the top of the crosshead 6. A flexible hose 20 is connected to the pipe 18 and has a loop 22 forwardly of the crosshead pin 8 on the side opposite from the crank 4. Below the crosshead 6, the flexible hose 20 is disposed in a V-shaped retainer guide or channel 24 mounted substantially parallel to the plane of reciprocation of the pin 8. The hose 20 is connected to a lubricating fitting 26 on the outside of the frame by a pipe 25 through a coupler 28 anchored to the frame by a bracket 30.

By this arrangement, we have satisfactorily connected the reciprocating pin 8 to a stationary lubricant source. Due to the upstanding pipe 18, a relatively large loop 22 is provided in a small space, preventing breaking of the flexible hose by sharp bends or kinks being placed therein, and in conjunction therewith, the V-shaped retainer guide 24 prevents a whipping movement or vibration being set up in the hose thereby prolonging its life so that the power unit need not be shut down due to failure of the pin lubricating means.

While we have shown and described one specific embodiment of our invention, it will be understood that this embodiment is merely for the purpose of illustration and descriptoin and that various other forms may be devised within the scope of our invention, as defined in the appended claims.

We claim:

1. Lubricating means for a connector pin in a crank-driven reciprocating crosshead, said pin having a channel therein extending from the outer end thereof to the bearing surface comprising a pipe carried by the crosshead and communicating with the outer end of said channel and extending upwardly toward the top of the crosshead on which the pin is mounted, a flexible hose connected to the upper end of said pipe, a downwardly extending loop in said hose to one side of said pin and an elongated guiding support below said pin disposed substantially parallel to the plane of reciprocation of said crosshead for carrying a portion of said hose below said loop.

2. Lubricating means for connector pin in a crank-driven reciprocating crosshead, said pin being contained in a housing and having a channel therein extending from the outer end thereof to the bearing surface comprising a rigid upwardly extending pipe carried by the crosshead and in communication with the outer end of said channel, a flexible hose connected to the upper end of said pipe, a downwardly extending loop in said hose to one side of said pin and a V-shaped channel below said pin disposed substantially parallel to the plane of reciprocation of said crosshead for carrying a portion of said hose below said loop.

3. Lubricating means for a connector pin in a reciprocating crosshead comprising upstanding pipe means carried by the crosshead and communicating with said pin, a flexible hose connected to the upper end of said pipe means, a loop in the hose to one side of said pin and means below said pin supporting a portion of said hose.

4. Lubricating means for a connector pin in a reciprocating crosshead, said pin having a channel therein extending from its outer end to the bearing surface thereof comprising connector means carried by the crosshead and communicating with the outer end of said channel, a flexible hose connected to said connector means, a downwardly extending loop in said hose to one side of said pin and an elongated guiding support below said pin disposed substantially parallel to the plane of reciprocation of said crosshead for carrying a portion of said hose forwardly of said loop.

AUGUST R. MAIER.
WILLIAM J. REDMAN.

REFERENCES CITED

The following references are of record in the file of this patent:

UNITED STATES PATENTS

| Number | Name | Date |
|---|---|---|
| 1,034,143 | Reeves | July 30, 1912 |
| 1,123,359 | Paulson | Jan. 5, 1915 |
| 1,526,048 | Bristow | Feb. 10, 1925 |
| 1,795,297 | Dirkes | Mar. 10, 1931 |